Dec. 27, 1960 L. SUVERKROP 2,965,973
REEL FOR PLUMB BOB
Filed Nov. 21, 1957

Lew Suverkrop
INVENTOR
BY C. Hercus Just
ATTORNEY

United States Patent Office 2,965,973
Patented Dec. 27, 1960

2,965,973

REEL FOR PLUMB BOB

Lew Suverkrop, P.O. Box 436, Bakersfield, Calif.

Filed Nov. 21, 1957, Ser. No. 697,908

11 Claims. (Cl. 33—217)

This specification covers a development which improves those geometric instruments known as plumb bobs, and particularly the kind such as that of Suverkrop's Patent No. 2,469,583 of May 10, 1949, having a reel for storage of the plumb bob cord. Its object is to provide a simple and economically manufactured means which is conveniently and quickly used for increasing the cord carrying capacity of such reels without either disturbing the balance of such bobs or interfering with their adjustment functioning. These and other objects will be apparent from the specification and accompanying drawing in which:

Figure 1:
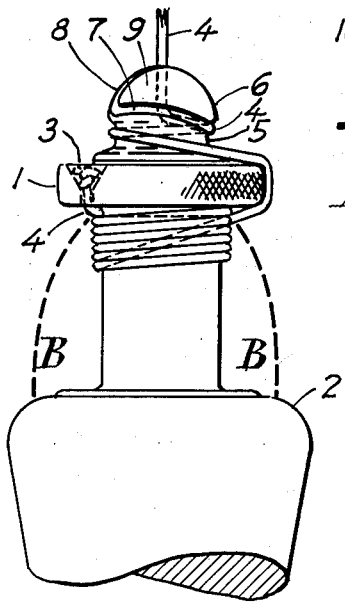
Fig. 1 is a side elevation of a fragmentary upper portion including the reel, of a plumb bob such as one covered by the said patent, and is illustrative of the limited cord carrying capacity of the old form of reel.

The use of the improvements covered by this specification will be more easily understood by first discussing briefly the manner in which the cord is used in the plumb bob of Patent No. 2,469,583. According to said patent, the reel in Fig. 1 is rotatable on a cylindrical stem interiorly of the reel and integral with the body 2 of the plumb bob. A conical cord anchoring cavity 3 in the upper flange of reel 1 is provided for securing the fast end of the cord 4 to the plumb bob while the free end of the cord 4 terminates at the other end in a conventional loop or hook for securing the cord at the point to or from which the plumb line is to be taken. When not in use the cord is stored between the flanges on the reel 1. In use, the approximate amount of cord is drawn from the reel, the cord is then passed over the upper flange of reel 1, wrapped once around neck 5 of head 6, and slipped into the slot 7 which, with slot 8, forms a hook 9 so that the plumb bob is suspended from the cord with the axes of cord and bob coincident. Then, rotating reel 1 relative to body 2 of the bob causes the cord 4 to wind upon or pay off from the neck 5 of the head 6, resulting in a very precise raising or lowering of the bob upon the cord 4 by which it is suspended, capable of fine adjustment.

In practice it has been found that if an excessive amount of cord is crowding the reel, so that the outer wrap thereof from which it passes to the neck 5 of the head is greater in diameter than is the flange, the fine adjustment action is unsatisfactory; and this is particularly so in heavier plumb bobs where usually it is desired most to have large cord capacity. In such case the fine adjustment will be uncertain. Due to slippage of the cord, considerable manipulation may be necessary to adjust and secure the bob at the precise height desired. This does not occur when the cord issues from the reel in a wrap having a diameter less than that of the flange. On the contrary, the action then is direct and sure; the precise height adjustment of the bob is made in a fraction of a second. The reason for this is plain. The slight knurling on the upper flange of reel 1 snubs the cord sufficiently so that, with the induced friction of the cord about and within the head 6, such slippage does not occur.

It has been found that by wrapping the cord on such a reel so that it occupies a space indicated approximately by the dotted lines marked B—B in Fig. 1 the bob can be finely adjusted conveniently. This is so because the cord going to the head 6 can then issue from a wrap the diameter of which is less than that of the upper flange of reel 1 as explained above. In storing cord on the reel, therefore, it is wrapped preferably into the tapered form indicated, avoiding the space immediately under said upper flange. Then, when it is desired to use the plumb bob, after drawing off the approximate amount of cord, a turn or two is taken with the cord around this small-diameter place adjacent to the upper flange, before passing the cord to the head as described. As indicated by the lines B—B, it has been found that at the lower end of the reel the wraps may extend beyond the diameter of the lower flange thereon. They are supported instead by the upper end of the body 1 of the bob. Wraps of cord so supported easily slide against the polished bob body 1 when rotating the reel, without interfering with rotating the reel. Wrapped in this way, the plumb bob now on the market covered by Patent No. 2,469,583 has a maximum convenient capacity of No. 3 braided cord amounting to 25 or 30 feet.

This amount is insufficient however in those fields such as construction work where this plumb bob has found its greatest usefulness. Of course, the capacity could be increased by enlarging the reel. However, this would make the reel of ungainly size for many other uses. It would be impractical to seek to solve the problem by making bobs with different sizes of reels. The confusion and attendant increased cost would preclude this. Moreover, research has shown conclusively that a properly engineered balance, that is, one which results in a bob that damps down promptly, and therefore one not easily set to quivering from wind playing on the cord, requires two small a reel to give cord capacity frequently required.

Heretofore, those in trades requiring great length of cord have either carried it separately on a spool or wrapped what was wanted over the bob. In doing so, the consequently reduced efficacy in adjustment has been accepted by them as a makeshift arrangement, knowing that plain bobs have even less provision for carrying any quantity of cord. Although the action was not so good as with a moderate quantity of cord for which the reel was designed, there remained added convenience in the fine adjustment sufficient to temper any tendency to complain. The present improvement greatly increases cord carrying capacity without materially either increasing size of the reel or altering balance of the bob.

Figure 2:
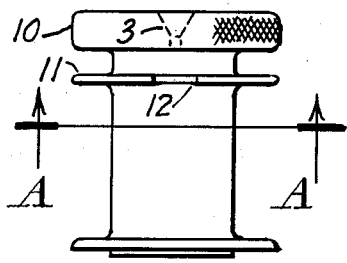
Fig. 2 is a view of an improved reel attachable to a plumb bob body and embodying the present invention.

In accordance with the present invention, this deficiency in existing plumb bobs is overcome by providing the reel 10 shown in Fig. 2 with an additional flange 11 made preferably thinner than either the lower or the knurled top flange of the reel, thus providing a plurality of reel sections upon the reel for respective purposes. The flange 11 preferably is placed rather closely to the knurled top flange of the reel. The space between this additional flange 11 and the top flange is made sufficient to accommodate a few wraps of cord. This is enough for the amount of cord used here, and still is not so narrow as to slow down the process of wrapping cord into it.

Figure 3:
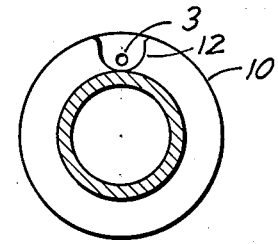
Fig. 3 is a sectional view along the line A—A of Fig. 2 showing a detail of the construction thereof.

As seen in Fig. 3, this additional flange 11 is provided with a notch 12 which is in registry with the cord anchoring hole 3. This facilitates putting new cord on the bob and gives ready access for passing the cord from one to another of the spaces adjacent to the flange 11.

Figure 4:
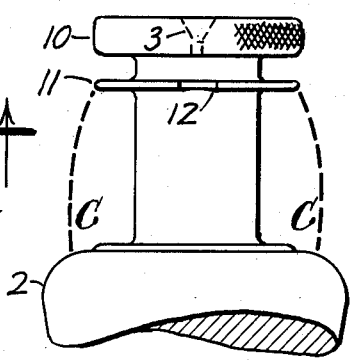
Fig. 4 is a view of the improved reel of Fig. 2 applied to a plumb bob illustrating the increased cord capacity of this improved reel.

In using a bob equipped with a reel having such a flange 11, the cord extends from the cord anchoring hole 3 as previously described and is stored principally in the larger section or space between additional flange 11 and the lower flange of the reel. Then, after withdrawing the required approximate quantity of cord from storage, a wrap or two is taken in the supplementary section or space above additional flange 11. From this supplementary space it is passed to the head 6 which is the same as shown in Fig. 1, making the bob ready for microheight adjustment. This takes place smoothly for the reason that the cord passes from wraps of diameter smaller than the upper flange diameter before passing over the latter to the head 6. By wrapping the cord in more numerous layers at the lower or larger section of the reel as described above and indicated by lines C—C in Fig. 4, this kind of reel increases the cord capacity of the reel to 40 or 45 feet of No. 3 cord without in the slightest reducing efficacy of the height adjustment feature.

Figure 5:
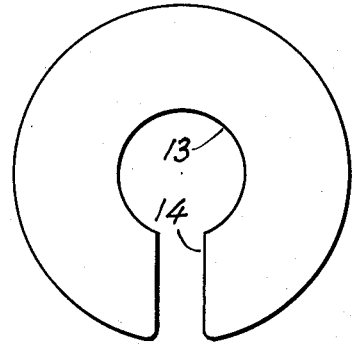
Fig. 5 is a view of a slotted ring attachment comprising another embodiment of the invention, the use of which still further increases cord carrying capacity of reels.
Figure 6:
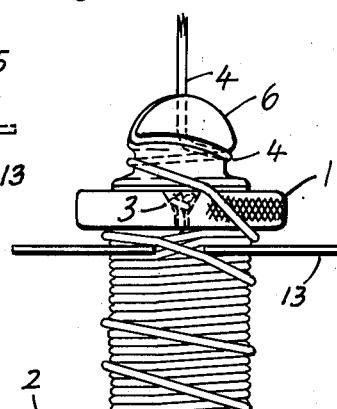
Fig. 6 is a side elevation showing the special notched ring shown in Fig. 5 applied to a plumb bob and illustrates the added cord capacity thereby achieved.
Figure 6:
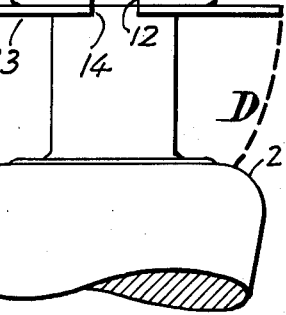

The cord carrying capacity of the storage section of the reel can be still further increased to 55 or 60 feet of the same size of cord by use of the simple attachment shown in Fig. 5, as generally indicated by lines D—D of Fig. 6. The attachment comprises a slotted, centrally apertured ring or disc 13 which is made of any suitable flexible material such as synthetic resin sheet material of about 1/32 inch thickness. Linen-reinforced phenol-formaldehyde product known as Bakelite is one specific example of suitable material. The inside diameter of slotted disc 13 is approximately equal to the diameter of the reel between the flanges thereof and to which it is to be applied. By making the inside diameter of disc 13 slightly smaller in diameter than that of the reel 1 to which it is applied, the disc will frictionally engage said reel and thereby secure the disc to the reel at any desired position. The outside diameter of the disc 13 is made considerably larger than the flange diameter; and it has been found that a diameter of approximately 1¾ inches is suitable for bobs of the 16 oz. size, for example, now on the market and covered by Patent No. 2,469,583.

Figure 8:
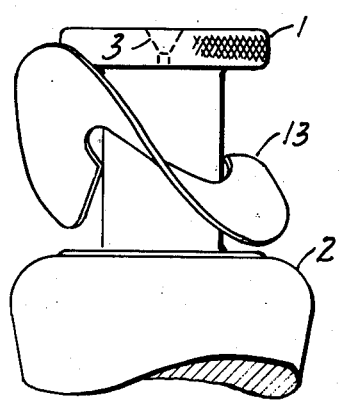
Fig. 8 is a fragmentary side elevation showing the manner of applying to reels the slotted ring of Fig. 5.

Slotted disc 13 is applied to a reel by pressing the mouth of its slot against the spool portion of the reel between the flanges and then twisting it in the manner indicated in Fig. 8. This spreads the slot so the disc 13 snaps over and encircles the reel in the manner indicated in Fig. 6. Then, by registering the slot 14 in disc 13 with notch 12 in the additional flange 11, the cord may be passed directly through said notch and slot from cord anchoring hole 3 to the lower part of the reel, between disc 13 and the lower flange of the reel for storage. Regardless of whether this space is fully occupied or not, the slot 14 in disc 13 and the notch 12 in flange 11 facilitate passing cord from the storage section of the reel to the supplementary section immediately below the upper knurled flange of reel 10. As before, the cord is given a wrap or two in this supplementary space immediately below the upper knurled flange before passing it over said upper flange to the head for suspension and application of the fine adjustment feature.

Figure 7:
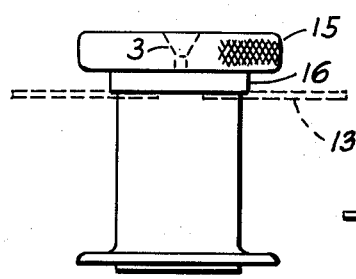
Fig. 7 is a side elevation showing another embodiment of plumb bob reel which is especially adapted to use of the slotted ring shown in Fig. 5.

A still different form of reel 15 embodying the invention is shown in Fig. 7. In this form the additional flange 11 is omitted, but an annular shoulder 16 is provided against which the slotted disc 13 may abut and upon which several turns of cord may be wound before passing the cord to head 6. In this construction the slotted disc 13 serves all the functions of an additional flange. Although the shoulder of reel 15 shown in Fig. 7 does not offer the amount of support given disc 13 by the flange 11 of Fig. 2, it has been found that the synthetic resin material mentioned is sufficiently stiff to obviate objectionable deflection of disc 13 under the load of cord wrapped in the storage section of the reel 15. This construction has the advantage of simplicity and slightly greater cord capacity due to elimination of the volume of additional flange 11 of Fig. 2. It has the disadvantage, when desired to eliminate the disc 13, that the reel 15 has but slightly less, rather than any greater cord capacity, compared to the plain reel 3 of Fig. 1. In comparison with this, the construction using additional flange 11 but not using disc 13 gives appreciably greater cord capacity than reel 15 without disc 13.

Figure 9:
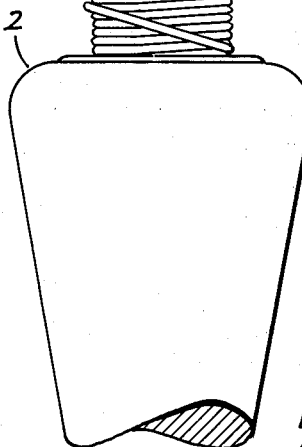
Fig. 9 is a fragmentary side elevation showing the slotted ring shown in Fig. 5 applied to plain reels of plumb bobs and illustrates the increased cord carrying capacity thereby achieved.

In still another embodiment shown in Fig. 9, slotted disc 13 may be attached to the plain reel of Fig. 1, using the cord alone to secure disc 13 in position on the reel 1. To do this, the cord first may be given several tight wraps around the reel spool portion immediately below the upper knurled flange. This provides a shoulder against which disc 13 can be abutted similarly to the use of reel 15 in Fig. 7. The cord is then passed through the slot 14 to the storage section below disc 13. Here it is first wrapped in a single tight layer extending across the space between disc 13 and the lower flange of reel 1. The cord may then be stored upon this section by wrapping it upon this first layer, tightly or loosely, as desired. When using the bob, after reeling off the approximate amount of cord wanted, several wraps of cord are made in the space immediately below the knurled upper flange. From here the cord is passed over the upper flange to the head as described before.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A plumb bob having a reel at the upper end upon which cord is wound and provided with a radial flange at the upper end thereof, and cord suspension means connected to said plumb bob and mounted adjacent the outer end of said reel to receive cord from said reel and position the same axially of said plumb bob for suspension thereof from said cord, in combination with supplementary flange means upon said reel spaced axially from the upper flange thereof to provide a plurality of reel sections respectively used for storage of the principal portion of the cord and to accommodate at least several turns thereof from which the cord is passed to said cord suspension means.

2. The plumb bob set forth in claim 1 further characterized by said supplementary flange means being spaced from said radial flange a short distance below the same in use and parallel thereto.

3. The plumb bob set forth in claim 2 further characterized by said supplementary flange having a greater diameter than said radial flange on said reel.

4. A plumb bob having a reel at the upper end upon which cord is wound and provided with a radial flange at the upper end thereof, and cord suspension means connected to said plumb bob and mounted adjacent the outer end of said reel to receive cord from said reel and position the same axially of said plumb bob for suspension thereof from said cord, in combination with supplementary flange means upon said reel spaced axially below the upper flange thereof in use to provide a cord storage section and a supplementary section of less capacity to accommodate at least several turns of cord and from which it is passed to said cord suspension means, said supplementary flange having a space therein extending radially inward from the outer edge thereof and adapted to receive cord wound upon the storage section to permit winding a few turns thereof upon said supplementary section.

5. A plumb bob having a reel at the upper end upon which cord is wound and provided with a radial flange at the upper end thereof and having a cord attaching opening therein, and cord suspension means connected to said plumb bob and mounted adjacent the outer end of said reel to receive cord from said reel and position the same axially of said plumb bob for suspension thereof from said cord, in combination with supplementary flange means upon said reel spaced axially below the upper flange thereof in use to provide a cord storage section upon which the principal portion of the cord is wound and a supplementary section of less capacity to accommodate at least several turns of cord and from which the cord is passed to said cord suspension means, said supplementary flange having a space therein extending radially inward from the outer edge thereof and aligned substantially axially with said cord attaching opening in said radial flange, said space being arranged to receive cord wound upon said storage section to permit winding a few turns thereof upon said supplementary section.

6. A plumb bob having a reel mounted axially at the upper end thereof and upon which cord is wound, said reel having a radial flange at the upper end thereof, and cord suspension means connected to said plumb bob and positioned adjacent the outer end of said reel to receive cord from said reel and position the same axially of said plumb bob for suspension thereof from said cord, in combination with supplementary radial flange means fixed to said reel below and spaced axially from the upper flange thereof to provide a plurality of reel sections respectively used for storage of the principal portion of the cord and to accommodate at least several turns thereof from which the cord is passed to said cord suspension means.

7. A plumb bob having a reel mounted axially at the upper end thereof and upon which cord is wound, said reel being provided with a radial flange at the upper end thereof, and cord suspension means positioned above said reel in use and connected to said plumb bob to receive cord from said reel and position the same axially of said plumb bob for suspension thereof from said cord, in combination with supplementary radial flange means fixed to said reel a short distance axially below said upper flange to provide a plurality of reel sections of unequal capacity and respectively used for storage of the principal portion of the cord and to accommodate at least several turns thereof from which the cord is passed to said cord suspension means, said supplementary flange being thinner than said radial upper flange and being at least as great in diameter as said radial upper flange.

8. A plumb bob having a reel positioned substantially axially at the upper end thereof in use and upon which cord is wound, said reel having a radial flange adjacent the upper end thereof, and a head comprising cord suspension means connected to said plumb bob and positioned above the upper end of said reel to receive cord therefrom and position the same axially of said plumb bob for suspension thereof from said cord, in combination with a relatively thin flexible disc apertured to receive said reel and mounted thereupon in spaced substantially parallel relationship to said radial flange of said reel and below the same to provide an auxiliary flange, said disc being slotted substantially radially to permit flexing thereof for mounting said disc upon said reel.

9. A plumb bob having a reel positioned substantially axially at the upper end thereof in use and upon which cord is wound, said reel having a radial flange adjacent the upper end thereof, and a head comprising cord suspension means connected to said plumb bob and positioned above the upper end of said reel to receive cord therefrom and position said cord and plumb bob axially relative to each other for suspension of said plumb bob from said cord, in combination with a relatively thin flexible disc centrally apertured to receive said reel and mounted thereupon in spaced relationship below said radial flange of said reel to provide an auxiliary flange, said disc being slotted substantially radially to permit flexing thereof for mounting said disc upon said reel and said reel having an annular shoulder thereon below said radial flange of greater diameter than the aperture of said disc and operable to be abutted by said disc to position the same upon said reel in use.

10. A plum bob having a reel positioned substantially axially at the upper end thereof in use and upon which cord is wound, said reel having a radial flange adjacent the upper end thereof, and a head comprising cord suspension means connected to said plumb bob and positioned above the upper end of said reel to receive cord therefrom and position the same axially of said plumb bob for suspension thereof from said cord, in combination with a disc provided with a central aperture of slightly greater diameter than said reel and arranged to be mounted upon said reel in spaced relationship below said radial flange of said reel to provide an auxiliary flange and divide said reel into a plurality of sections, said disc being slotted substantially radially to permit flexing thereof for mounting said disc upon said reel and said disc being positionable axially upon said reel as desired by turns of cord disposed upon said reel at opposite sides of said disc.

11. A plumb bob having a reel positioned substantially axially at the upper end thereof in use and upon which cord is wound, said reel having a radial flange adjacent the upper end thereof, and a head comprising cord suspension means connected to said plumb bob and positioned above the upper end of said reel to receive cord therefrom and position the same axially of said plumb bob for suspension thereof from said cord, in combination with a relatively thin flexible disc having a substantially central aperture of slightly smaller diameter than said reel and mounted thereupon in spaced relationship below said radial flange of said reel to provide an auxiliary flange, said disc being slotted substantially radially to permit flexing thereof for mounting said disc upon said reel and the periphery of said central aperture frictionally engaging said reel to position the same axially thereon as desired.

References Cited in the file of this patent

UNITED STATES PATENTS

| | | |
|---|---|---|
| 1,925,671 | Mansfield | Sept. 5, 1933 |
| 2,236,370 | Jackman | Mar. 25, 1941 |